July 16, 1935. F. G. G. ARMSTRONG 2,007,952
SUSPENSION ARRANGEMENT FOR ROAD OR OTHER VEHICLES
Filed Jan. 12, 1934 4 Sheets-Sheet 1

Inventor:
Fullerton G. G. Armstrong,
By Armstrong, Mason & Porter,
Attorneys.

July 16, 1935.  F. G. G. ARMSTRONG  2,007,952
SUSPENSION ARRANGEMENT FOR ROAD OR OTHER VEHICLES
Filed Jan. 12, 1934  4 Sheets-Sheet 2
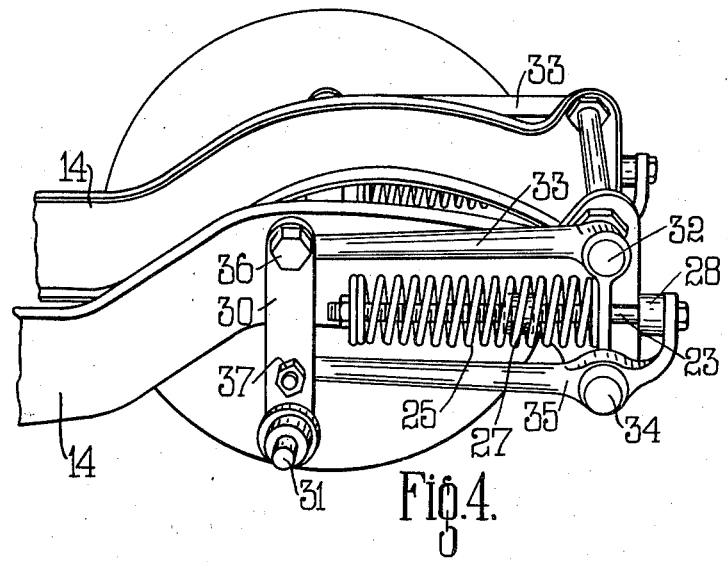
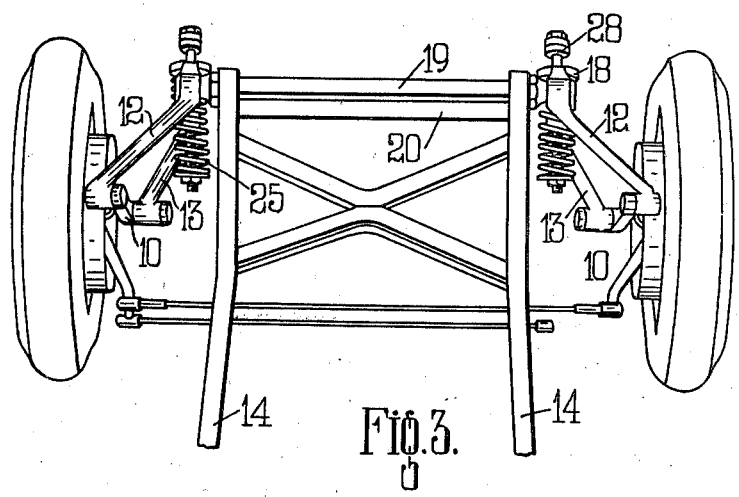

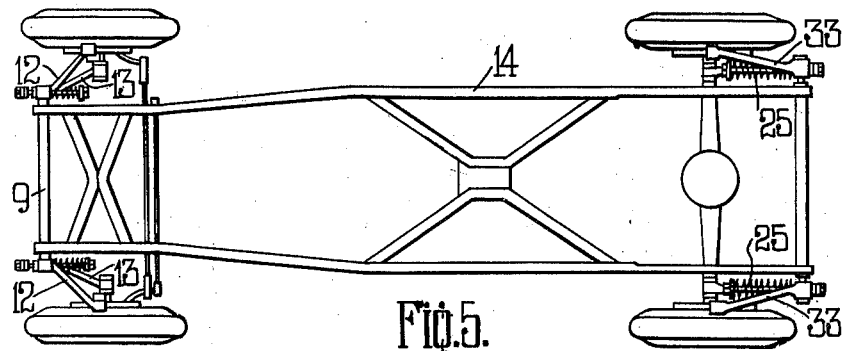
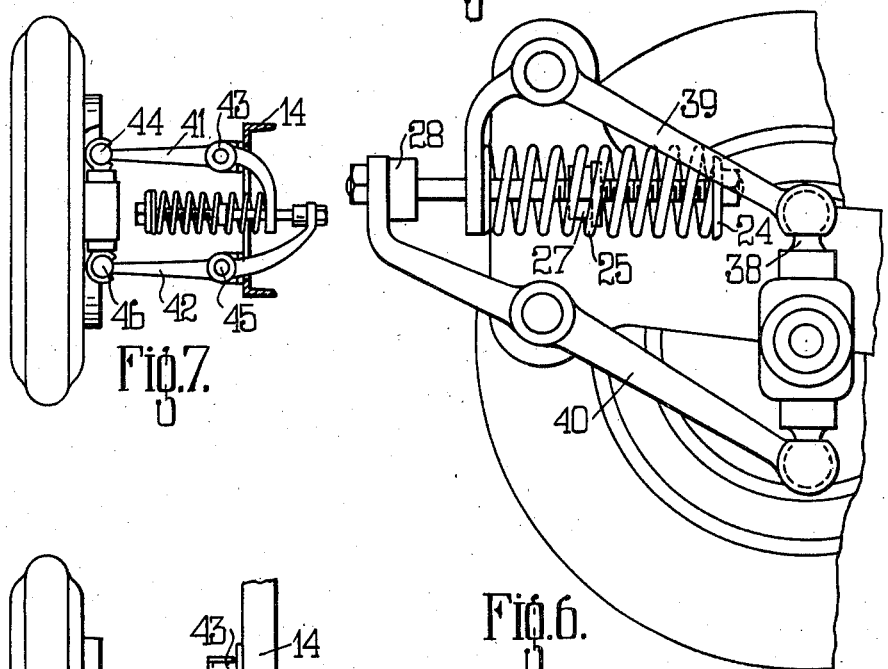
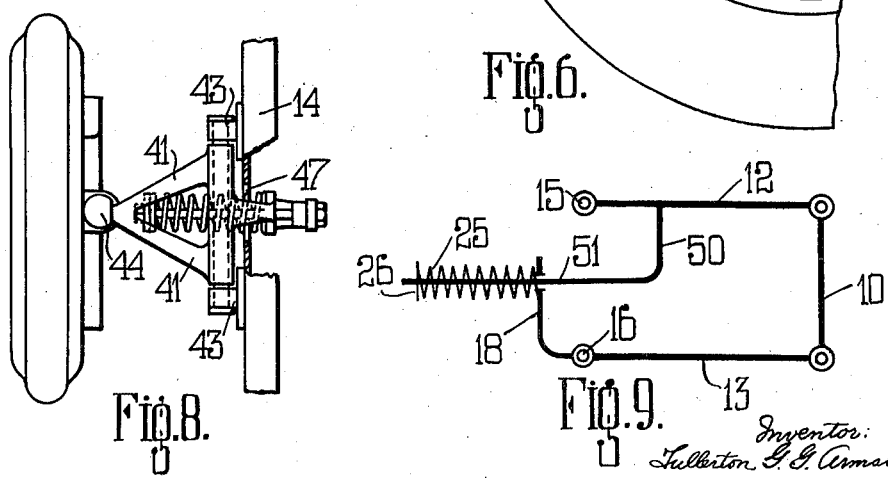

July 16, 1935.   F. G. G. ARMSTRONG   2,007,952
SUSPENSION ARRANGEMENT FOR ROAD OR OTHER VEHICLES
Filed Jan. 12, 1934    4 Sheets-Sheet 4
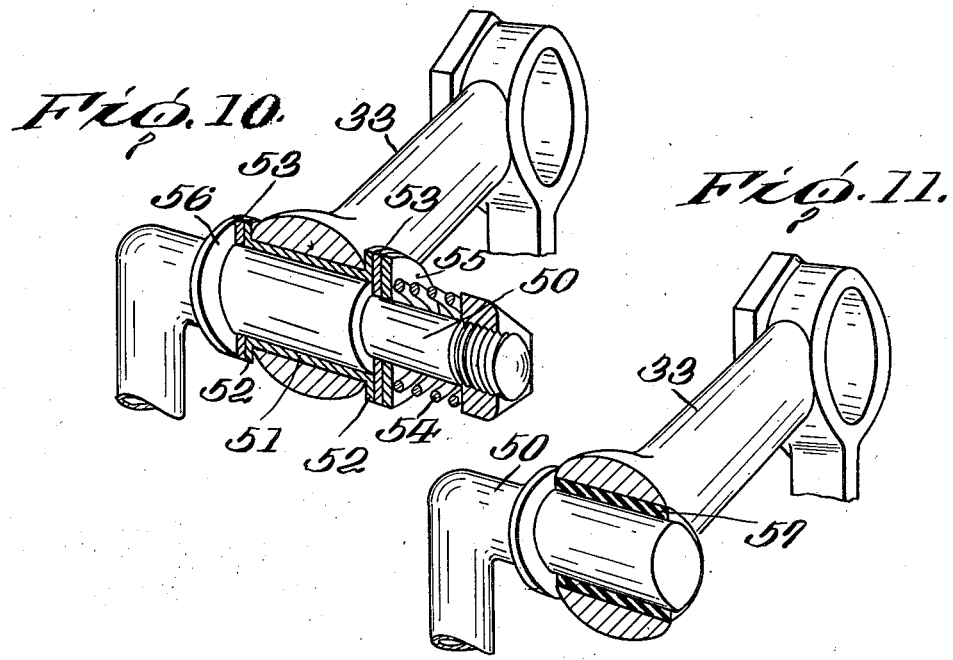
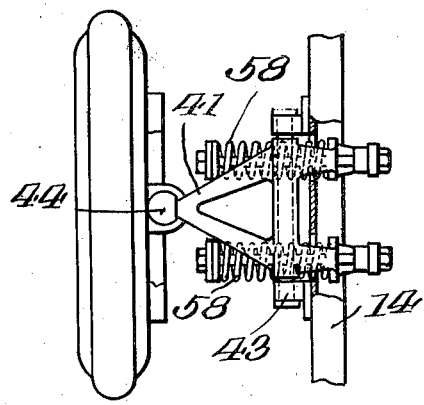
INVENTOR
F. G. G. ARMSTRONG.
By Sturtevant, Mason + Porter
ATTORNEYS Patented July 16, 1935

2,007,952

UNITED STATES PATENT OFFICE 2,007,952

SUSPENSION ARRANGEMENT FOR ROAD
OR OTHER VEHICLES

Fullerton George Gordon Armstrong, Beverley,
England

Application January 12, 1934, Serial No. 706,429
In Great Britain January 12, 1933

16 Claims. (Cl. 267—20)

The present invention relates to improvements in suspension arrangements for road or other vehicles, of the type in which the frame of the vehicle has a pair of pivots displaced from one another, carrying levers, the opposite ends of which are attached to an axle of a wheel, the displacement of the levers about their pivots being restrained to a desired degree by means of springs or other resilient means.

Where reference is made herein to resilient means, this is intended to include springs, particularly of the helical type, rubber or other elastic means, or again pneumatic means, or any other device wherein a load is progressively applied for damping purposes.

The suspension arrangement for road or other vehicles of the type set forth is characterized by the present invention in that one or both the levers are extended beyond their pivots on the frame of the vehicle to engage with resilient means supported by the extensions.

Preferably the extensions of the levers operate in opposed relationship on the resilient means which also is located between the levers.

The ends of the levers adjacent the wheel are pivotally connected to a link which retains its angular position relatively to the frame although displaceable with said levers. Thus when the link is normally vertical it remains so despite angular displacement of the levers. If desired however the link may be fitted at an angle to the vertical whilst the pivots for the levers on the frame may also be disposed on a line inclined to the vertical instead of one being directly above the other.

The pivots of the levers with the link may either be in the same vertical plane passing through or parallel to the link, or again the upper pivot may be displaced sideways out of said plane and relatively to the lower pivot.

When the invention is applied to the steering wheels of vehicles, if desired, the vertical link instead of being connected to the king pin may be constituted by the king pin itself.

Any form or combination of resilient means may be employed, but preferably this consists of a helical spring which is carried between one end of a rod on one of the lever extensions and between the other lever extension, the end of which surrounds said rod, an adjustable compression bumping pad being provided on the rod to limit the movement of the wheel vertically in one direction and a rebound bumping pad also adjustable on the rod being provided to limit the vertical movement of the wheel in the opposite direction.

The improved suspension of the present invention is applicable either to arrangements where a pair of wheels are carried by a rigid axle or where individual wheels are independently sprung.

The invention is more particularly described with reference to the accompanying drawings, in which:—

Figure 3 is a plan view of the front end of a car frame with the steering wheels.

Figure 4 is a perspective view of the rear end of a vehicle frame with the invention applied thereto, but with one rear wheel omitted for the sake of clarity.

Figure 5 is a plan view of the whole of the frame of a vehicle supported on its wheels.

Figure 6 is an elevational view of a modified form of construction.

Figure 7 is a front elevational view of a further modified form of construction.

Figure 8 is a plan view corresponding to Fig. 7.

Figure 9 is a diagrammatic view of a still further modified form of construction.

Fig. 10 is a detail view of one form of damping means for the joints.

Fig. 11 is a detail view of a rubber sleeve at the joints.

Fig. 12 is a view, similar to Fig. 8, but showing a modification thereof.

Figure 1:
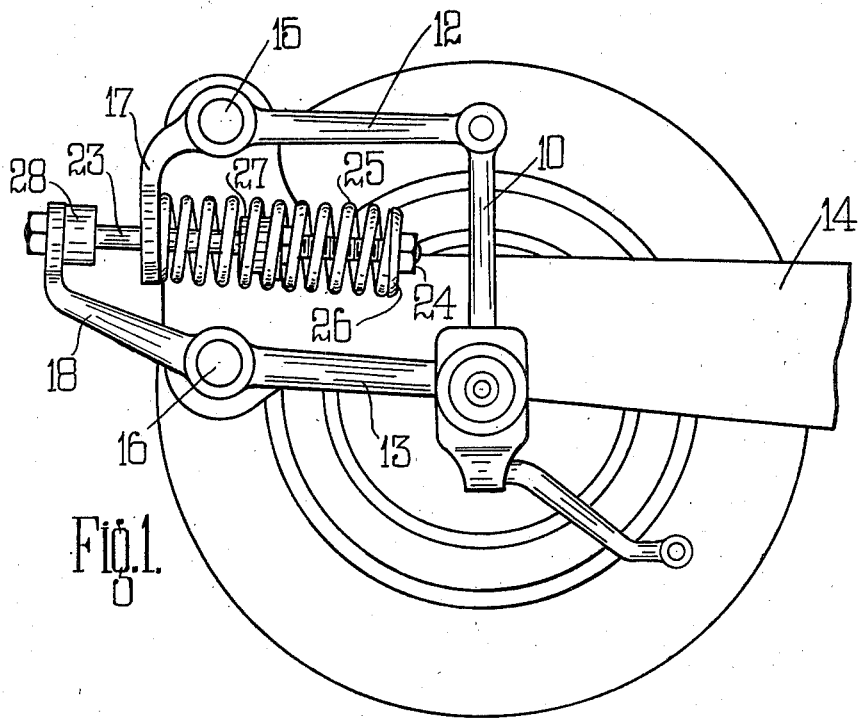
Figure 1 is an elevational view of the invention as applied to a front or steering wheel of a vehicle.
Figure 2:
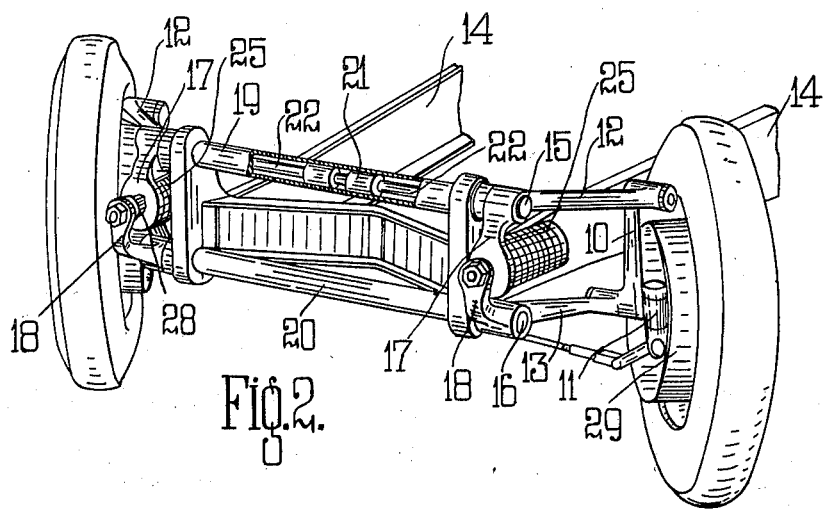
Figure 2 is a perspective view showing a pair of front wheels independently sprung in a manner consistent with the present invention.

Referring to Figures 1–3 of the drawings, a vertical link 10 is connected to a king pin 11 and in turn has pivotally mounted thereon upper and lower levers 12, 13, which are pivoted to the frame 14 of the vehicle at 15, 16, respectively, said levers 12, 13 being in the form of bell cranks, that is to say, they have extensions 17, 18, respectively which are angularly displaced about the pivots 15, 16, on displacement of the levers.

Each of the levers 12, 13, is rigidly fixed to a shaft which is located within a transverse tubular member extending between the side frame members 14, said tubular members being illustrated at 19, 20, and carrying bearings 21 intermediate their ends for supporting the shafts during their angular displacement on displacement of the levers 12, 13.

As will be seen in Figure 2, the upper levers 12 are connected to shafts 22 which extend to substantially a mid position within the tubular member 19. The same applies to the lower levers 13, but in this case the tubular member is not broken away as illustration of the upper shafts is deemed sufficient for descriptive purposes. In addition to the bearings 21 intermediate the ends of the tubular members and adjacent one end of each shaft 22 a main bearing is provided for such shafts 22 adjacent the pivots 15, 16 on the frame 14.

A rod 23, preferably of the screw threaded type is connected to the extension 18 of the lever 13 and carries at its free end a nut 24, the extension 17 of the corresponding upper lever 12 having a hole formed therein to enable said extension to surround the rod 23. A helical spring 25 is carried between the extension 17 and the disc 26 which latter may be constituted, if desired, by a flange on the nut 24. Thus, the compression of the spring 25 when the frame is in its unloaded position may be varied by displacement of the nut 24.

A bumping pad 27 in the form of a washer and nut 27ª is adjustably mounted on the threaded rod 23 to limit the angular displacement of the levers about their pivots when the wheel is vertically displaced in one direction whilst a rebound bumping pad 28 is adapted to limit the rebound movement in the opposite direction.

It will be noticed, particularly from examination of Figures 2 and 3 that the pivots for the levers 12 about their corresponding vertical links 10 are not in the same vertical plane as the pivots for the lower levers 13 about such links 10. By this means the upper pivots may be displaced within the wheel contour to lie above the brake drums 29 thereby enabling the upper points of support to lie as near as possible to the vertical, intersecting the points of contact of the wheels with the road.

It will be appreciated that when a wheel passes over an obstruction in the road the levers 12, 13, are angularly displaced respectively about their pivots 15, 16, with the link 10 remaining vertical with the result that the free end of the extension 17 is displaced longitudinally towards the frame and the free end of the extension 18 longitudinally away from the frame. As a result of this the extension 17 and the nut 24 are displaced towards one another thereby compressing the spring 25. It will be appreciated that during such displacement a parallel motion is given to the levers whilst the braking torque is taken by the levers leaving the spring 25 to support the weight of the vehicle.

It will also be appreciated that by permitting the rod 23 to take up an inclined position on angular displacement of the levers, the spring 25 is compressed evenly without any tendency to bend in a transverse direction. It will also be observed that by virtue of the independent wheel mounting, the spring 25 at one side of the vehicle may be compressed without the other spring being brought into action.

The spring at the rear end of the frame is illustrated in Figure 4. In this case substantially the same principle is maintained, the difference being in the construction of the vertical link which is illustrated at 30, the axis of rotation of the rear wheels being shown at 31. In this construction a main bearing is provided at the pivot 32 for the upper bell crank lever 33, any form of flexible bearing at the pivot 34 for the lower bell crank lever 35, and any form of flexible bearing at the pivots 36, 37 for the upper and lower levers 33, 35 respectively on the vertical link 30.

If desired a flexible bearing may be substituted for the main bearing at the pivot 32. Again if desired friction or other damping means may be employed at any or all of the joints and one form of such damping means is shown in Fig. 10, wherein an arm 50 carries a boss 51 between which the lever 33 is mounted. Friction discs 53 are located against the flanged ends of the boss and a spring 54 bearing against a washer 55 holds the washer against one friction disc and an abutment 56 against the other disc. The spring arrangement is exactly the same as with the front or steering wheels.

It will be noticed from an examination of Figure 5 that the total weight of the vehicle body is carried between the extreme ends of the frame 14, and as a result all pitching movements which otherwise would be created on the body are cut out to give, in effect, a long wheel base. It will be appreciated however that the spring suspension may be arranged in rear of the front axle and in front of the rear axle respectively.

In the construction according to Figure 6, the vertical link instead of being connected to a king pin is constituted by the king pin itself which is illustrated at 38, a universal joint connection being provided between upper and lower bell crank levers 39, 40 and said king pin.

Figure 6 is intended to be diagrammatic only. In practice, for example, either the king pin or the levers would have spherical ends which are let in through the sides of spherical bearing faces in the levers or the king pin respectively thereby ensuring contact between the spherical ends and their bearing faces when the king pin is being displaced in a vertical direction due to the wheel hitting an obstruction in the road.

In all cases where spherical bearings are provided a rubber insert may be mounted between the ball and its seating. Again, where plain or flexible bearings are shown these may be of any shape and of the type wherein a rubber sleeve 57 is mounted between the inner and outer bearing elements as shown in Fig. 11, and takes up the angular displacement between the elements by virtue of distortion within itself, that is to say, the skin or surface of the rubber sleeve is rigid with the inner and outer bearing members.

Turning to the construction illustrated in Figures 7 and 8, the frame is illustrated in transverse section at 14, the upper lever at 41, the lower lever at 42, the pivot of the upper lever with the frame at 43 and with the vertical pin, which is illustrated as a king pin, at 44, whilst the lower lever 42 is pivoted to the frame at 45 and to the king pin at 46.

In this construction the upper and lower levers are duplicated and take up a substantially triangular formation as will be seen in the plan view of Figure 8, there being two pivots 43 for the upper lever 41 on the frame and one pivot with the king pin. The same applies to the lower lever 42.

In this construction, instead of arranging the spring longitudinally of the frame it is arranged substantially transversely thereof and may pass through a hole 47 cut in the frame.

The extensions of the levers with their co-operating rods, springs, bumper pads and stop means are similar to those described in Figure 1. If desired, however, instead of providing a single spring as shown in Figures 7 and 8 between the upper duplicated form of levers 41 and the lower duplicated form 42, a pair of extensions with accompanying pairs of transverse springs 58 may be provided in the region of the pivots 43 as shown in Fig. 12, instead of single extensions of the upper and lower levers and a single co-operating spring.

In the still further modified form of construction diagrammatically illustrated in Figure 9, only the lower lever 13 is provided with an extension 18 beyond its pivot 16 on the frame, the upper lever 12 having no extension beyond its corresponding pivot 15. In this construction the upper lever 12 is provided with a depending arm 50 having a substantially horizontal portion 51 which extends to a position beyond the extension 18 of the lower lever 13, the spring 25 being mounted between the free end of the extension 18 on the lower lever 13 and the adjustable stop 26 on the horizontal portion 51. In this construction it will be observed that the upper lever 12, the depending arm 50 and its horizontal portion 51 move as a single element when the link 10 is vertically displaced, such displacement causing relative longitudinal displacement of the stop 26 and the free end of the extension 18 on the lower lever 13 to compress the spring or release it from compression as the case may be. It will thus be seen that a relatively long spring 25 may still be employed even when only one lever 12 or 13 is provided with an extension beyond its pivot on the frame while still maintaining the spring 25 supported between the levers or elements showing therewith as distinct from being supported on the frame.

It is, of course, obvious that various modifications and changes in the arrangement of parts and details of construction may be made without departing from the scope of the invention as set forth in the appended claims.

I declare that what I claim is:—

1. A suspension arrangement for vehicles comprising a vehicle frame, a vehicle wheel, a pair of levers pivotally connected to said frame at spaced points one above the other, a pivotal link interconnecting the axle of said wheel and the free ends of said levers, an extension at the opposite end of at least one of said levers beyond the pivotal connection on the frame, and resilient means supported by and bodily displaceable with said levers for resisting relative angular displacement of said levers in one direction with said frame.

2. A suspension arrangement for vehicles comprising a vehicle frame, a vehicle wheel, a pair of levers pivotally connected to said frame at spaced points one above the other, a pivotal link interconnecting the axle of said wheel and the free ends of said levers, extensions at the opposite ends of said levers beyond their pivotal connections on said frame, and resilient means supported by said lever extensions for bodily displacement therewith and for resisting relative displacement between said lever extensions on relative displacement of said lever extensions with said frame.

3. A suspension arrangement for vehicles comprising a vehicle frame, a vehicle wheel, a pair of levers pivotally connected to said frame at spaced points one above the other, a pivotal link interconnecting the axle of said wheel and the free ends of said levers, extensions at the opposite ends of said levers beyond their pivotal connections on said frame and resilient means supported wholly by and between said lever extensions for resisting relative displacement of said wheel, link and spaced levers with said frame.

4. A suspension arrangement for vehicles comprising a vehicle frame, a vehicle wheel, a pair of bell crank levers pivotally connected at their elbows at spaced points one above the other on said frame, a substantially vertical pivotal link interconnecting the axle of said wheel with one end of each bell crank lever and resilient means supported by the other ends of said levers for resisting their relative displacement on relative displacement of said wheel, said link and said levers with said frame.

5. A suspension arrangement for vehicles comprising a vehicle frame, a wheel, a substantially vertical link connected to the axle of said wheel, a lever pivotally connected to the frame and having one end thereof pivotally connected to the upper end of said link, a second lever pivotally connected to the frame at a point below the pivotal connection of said first lever thereon and having one end thereof pivotally connected to the base of said link, a projection on the opposite end of each of said levers at least one of which is in the form of an extension beyond the pivotal point of its lever on the frame, and resilient means carried by said projections for resisting relative displacement thereof with said frame.

6. A suspension arrangement for vehicles, comprising a vehicle frame, a wheel, a substantially vertical link connected to the axle of said wheel, a lever pivotally connected to the frame and having one end thereof pivotally connected to the upper end of said link, a second lever pivotally connected to the frame at a point below the pivotal connection of said first lever thereon and having one end thereof pivotally connected to the base of said link, extensions on the opposite end of said levers beyond their pivotal connections with the frame and resilient means supported wholly by said extensions for resisting their relative displacement on angular displacement of said levers in one direction about their pivots on said frame.

7. A suspension arrangement for vehicles comprising a vehicle frame, a vehicle wheel, a pair of levers pivotally connected to said frame at spaced points one above the other on said frame, a pivotal link interconnecting the axle of said wheel and the free ends of said levers, extensions on the opposite ends of said levers beyond their pivotal connections on said frame, and resilient means situated substantially longitudinally of the frame and between said levers and supported by said extensions for bodily displacement therewith whilst operated on by said extensions in opposite directions.

8. A suspension arrangement for vehicles comprising a vehicle frame, a vehicle wheel, a pair of levers disposed in different vertical planes and pivotally connected to said frame at spaced points one above the other, a pivotal link interconnecting the axle of said wheel and the free ends of said levers, extensions on the opposite ends of said levers beyond their pivotal connections on said frame and resilient means situated substantially longitudinally of the frame and between said levers and supported by said extensions for bodily displacement therewith whilst operated on by said extensions in opposite directions.

9. A suspension arrangement for vehicles comprising a vehicle frame, a vehicle wheel, upper and lower levers each pivotally connected to said frame at spaced points thereon, a pivotal link interconnecting the axle of said wheel, a pivot at the upper end of said link common to the free ends of said upper levers, a pivot on said link adjacent the base thereof, common to the free ends of said lower levers, extensions on said levers beyond their pivotal connections on said frame, and resilient means supported by said lever extensions extending transversely of the frame for bodily displacement with said lever extensions and for resisting relative displacement between said lever extensions on relative displacement of said lever extensions with said frame.

10. A suspension arrangement for vehicles comprising a vehicle frame, a vehicle wheel, upper and lower levers each of triangular formation and each connected to said frame at points spaced longitudinally of the frame with the pivotal connections of the upper lever on the frame above those of the lower lever with the frame, a pivotal link interconnecting the axle of said wheel with the apices of said triangular shaped levers, extensions on the opposite ends of said levers beyond their pivotal connections on said frame, and resilient means extending transversely of said frame and supported by said lever extensions for bodily displacement therewith and for resisting relative displacement between said lever extensions on relative displacement of said lever extensions with said frame.

11. A suspension arrangement for vehicles comprising a vehicle frame, a vehicle wheel, a pair of levers pivotally connected to said frame at spaced points one above the other, a pivotal link interconnecting the axle of said wheel and the free ends of said levers, an extension on the opposite end of at least one of said levers beyond the pivotal connections on the frame, a rod carried by said extension, stop means on said rod and spring means between said stop and said rod and the lever other than that carrying said rod for resisting relative angular displacement between said levers in one direction with said frame.

12. A suspension arrangement for vehicles comprising a vehicle frame, a vehicle wheel, upper and lower bell crank levers pivotally connected at their elbows at spaced points on said frame, a pivotal link interconnecting the axle of said wheel with one end of each bell crank lever, a rod carried by the other end of one of said levers, a fixed stop on said rod and spring means carried on said rod between said stop and the other end of the second bell crank lever for resisting relative displacement of said wheel, said link and said levers with said frame.

13. A suspension arrangement for vehicles comprising a vehicle frame, a vehicle wheel, upper and lower bell crank levers pivotally connected at their elbows at spaced points on said frame, a pivotal link interconnecting the axle of said wheel with one end of each bell crank lever, a rod carried by the other end of one of said levers, a fixed stop on said rod, spring means carried on said rod between said stop and the other end of the second bell crank lever for resisting relative displacement of said wheel, said link and said levers with said frame and bumper pads of resilient material mounted on said rod for providing the limits of relative displacement by said bell crank levers.

14. A suspension arrangement for vehicles comprising a vehicle frame, a vehicle wheel, upper and lower bell crank levers pivotally connected at their elbows at spaced points on said frame, a pivotal link interconnecting the axle of said wheel with one end of each bell crank lever, a rod carried by the other end of one of said levers, a fixed stop on said rod, spring means carried on said rod between said stop and the other end of the second bell crank lever for resisting relative displacement of said wheel, said link and said levers with said frame, adjustable bumping pads mounted on said rod between which the free end of one bell crank lever is displaceable on relative displacement of said levers with said frame and means to adjust the position of said resilient bumper pads on said rod.

15. A suspension arrangement for vehicles comprising a vehicle frame, a wheel, a link connected to the axle of said wheel, an upper lever pivotally connected at one end to the upper end of said link and intermediate its ends to the frame, a second and lower lever disposed out of the true vertical plane which passes longitudinally through the upper lever, said second lever being pivotally connected at one end to the base of said link and intermediate its ends to the frame, and resilient means supported by one of the opposite ends of said levers beyond its pivotal point on the frame for engagement by the other of said lever extensions to resist relative displacement of said levers with said frame in one direction of movement.

16. A suspension arrangement for vehicles comprising a vehicle frame, a vehicle wheel, a pair of levers pivotally connected to said frame at points spaced one above the other, means for interconnecting one end of each of said levers with the axle of said wheel, extensions at the opposite ends of said levers beyond their pivotal connecting points on said frame, and means supported wholly by said extensions and bodily displaceable with said levers for resisting relative displacement of said wheel and relative displacement of said levers with respect to said frame.

FULLERTON GEORGE
GORDON ARMSTRONG.